(12) United States Patent
Soukharev et al.

(10) Patent No.: US 11,165,577 B2
(45) Date of Patent: Nov. 2, 2021

(54) SYSTEM AND METHOD FOR OPTIMIZED ELLIPTIC CURVE CRYPTOGRAPHY OPERATIONS

(71) Applicant: INFOSEC GLOBAL INC., Toronto (CA)

(72) Inventors: Vladimir Soukharev, Toronto (CA); Basil Hess, Zurich (CH)

(73) Assignee: INFOSEC GLOBAL INC., Toronto (CA)

(*) Notice: Subject to any disclaimer, the term of this patent is extended or adjusted under 35 U.S.C. 154(b) by 0 days.

(21) Appl. No.: 16/539,655

(22) Filed: Aug. 13, 2019

(65) Prior Publication Data

US 2020/0044846 A1 Feb. 6, 2020

Related U.S. Application Data

(63) Continuation of application No. PCT/CA2017/050174, filed on Feb. 13, 2017.

(51) Int. Cl.
*H04L 9/30* (2006.01)
*G06F 7/72* (2006.01)
(52) U.S. Cl.
CPC ........... *H04L 9/3066* (2013.01); *G06F 7/725* (2013.01)

(58) Field of Classification Search
None
See application file for complete search history.

(56) References Cited

U.S. PATENT DOCUMENTS

| 2008/0260143 A1* | 10/2008 | Ibrahim | H04L 9/3013 380/28 |
| 2011/0200187 A1* | 8/2011 | Ghouti | H04L 9/3093 380/43 |

\* cited by examiner

*Primary Examiner* — Brandon S Hoffman
(74) *Attorney, Agent, or Firm* — Bhole IP Law; Anil Bhole; Marc Lampert

(57) ABSTRACT

A method and protocol for determining linear combinations of a first and second point for an elliptic curve cryptography scheme, including determining a first scalar multiplication of the first point with a first scalar, the first scalar multiplication including performing iteratively in relation to the value of the first scalar either one of: doubling of the first point in Jacobian projective coordinates; or mixed addition with the first point in affine coordinates; determining a combination point by adding the second point to the resultant of the first scalar multiplication; obtaining an affine coordinate representation of the combination point; determining a second scalar multiplication of the combination point with a second scalar, the second scalar multiplication including performing iteratively in relation to the value of the second scalar either one of: doubling of the combination point in Jacobian projective coordinates; or mixed addition with the combination point in affine coordinates.

13 Claims, 9 Drawing Sheets

SYSTEM AND METHOD FOR OPTIMIZED ELLIPTIC CURVE CRYPTOGRAPHY OPERATIONS

TECHNICAL FIELD

The following relates to data communication systems and cryptographic schemes utilized in such systems; and more specifically, to determinations of linear combinations in elliptic curve cryptography.

BACKGROUND

Elliptic curve-based cryptographic ("ECC") schemes can use optimizations to enhance computational performance of a system employing the ECC scheme.

In some cases, ECC schemes can use countermeasures to avoid attacks from adversaries. Such countermeasures can include simple side-channel attack countermeasures ("SSCA countermeasures") and differential side-channel attack countermeasures ("DSCA countermeasures"). However, in some cases, schemes with countermeasures can detriment performance and increase computational cost. In this regard, optimizations can be used to assure advantageous performance despite the implementation of countermeasures.

Conventional techniques for optimization in ECC schemes generally include an attempt to optimize a signature verification step. Such techniques focus on speeding up the verification process in particular. Generally, for such optimizations of the verification step are directed to checking if a left side of a verification equation is equal to a right side of such equation; hence, such optimization techniques generally involve bringing the equation terms to one side of the equation and finding an optimal approach to determine if the result is an identity point.

However, conventional approaches to optimization in ECC schemes are typically not sufficiently optimized or are only directed to a specific purpose, such as the verification step. Thus, such optimizations do not satisfactorily optimize performance of a system employing the ECC and such optimizations lack sufficient generality.

It is therefore an object of the present invention to provide approaches in which the above disadvantages are obviated or mitigated and attainment of the desirable attributes is facilitated.

SUMMARY

In an aspect, there is provided a protocol for determining linear combinations of a first point and a second point for an elliptic curve cryptography scheme, the elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the first point and the second point in affine coordinates, the protocol comprising: obtaining a Jacobian projective coordinate representation of the first point; determining a first scalar multiplication of the first point with a first scalar, the first scalar multiplication comprising performing iteratively in relation to the value of the first scalar either one of: doubling of a current value of the first point in Jacobian projective coordinates; or mixed addition of a current value of the first point with the initial value of the first point in affine coordinates; determining a combination point by adding the second point to the resultant of the first scalar multiplication; obtaining an affine coordinate representation of the combination point; determining a second scalar multiplication of the combination point with a second scalar, the second scalar multiplication comprising performing iteratively in relation to the value of the second scalar either one of: doubling of a current value of the combination point in Jacobian projective coordinates; or mixed addition of a current value of the combination point with the initial value of the combination point in affine coordinates; and transforming the resultant of the second scalar multiplication to affine coordinates.

In a particular case, the first point or the second point, or both, is a generator point of the elliptic curve.

In another case, mixed addition with the first point comprises performing addition on the current value of the first point at a particular iteration, in Jacobian projective coordinates, with the initial value of the first point, in affine coordinates, to obtain a resultant value for the first point in Jacobian projective coordinates, and mixed addition with the combination point comprises performing addition on the current value of the combination point at a particular iteration, in Jacobian projective coordinates, with the initial value of the combination point, in affine coordinates, to obtain a resultant value for the combination point in Jacobian projective coordinates.

In another aspect, there is provided a method for determining a linear combination operation for an elliptic curve cryptographic scheme, the elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the linear operation comprising a first scalar ("r"), a second scalar ("s"), a first point ("Q") in affine coordinates, and a second point ("P") in affine coordinates, the linear operation having a representation in the form s·(P+r·Q), the method comprising: obtaining a Jacobian projective coordinate representation of the first point; determining a first resultant point via scalar multiplication of the first point by the first scalar using a double-and-add technique, the first resultant point being in Jacobian projective coordinates; determining a combination point by adding the first resultant point to the second point; obtaining a Jacobian projective coordinate representation of the combination point; determining a second resultant point via scalar multiplication of the combination point by the second scalar using a double-and-add technique, the second resultant point being in Jacobian projective coordinates; and transforming the second resultant point into affine coordinates.

In a particular case, determining the first resultant point via scalar multiplication using the double-and-add technique comprises mixed addition with the first point using the affine coordinates of the first point, and determining the second resultant point via scalar multiplication using the double-and-add technique comprises mixed addition with the combination point using the affine coordinates of the combination point.

In another case, mixed addition with the first point comprises performing addition on a current value of the first point at a particular iteration, in Jacobian projective coordinates, with the initial value of the first point, in affine coordinates, to produce a resultant value for the first point in Jacobian projective coordinates, and mixed addition with the combination point comprises performing addition on a current value of the combination point at a particular iteration, in Jacobian projective coordinates, with the initial value of the combination point, in affine coordinates, to produce a resultant value for the combination point in Jacobian projective coordinates.

In yet another case, determining the combination point comprises mixed addition of the first resultant point in Jacobian projective coordinates with the second point in affine coordinates.

In yet another case, the first point or the second point, or both, is a generator point of the elliptic curve.

In yet another aspect, there is provided a protocol for determining linear combinations of a first point and a second point for an elliptic curve cryptography scheme, the elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the first point and the second point in affine coordinates, the protocol comprising: obtaining a Jacobian projective coordinate representation of the first point; obtaining a Jacobian projective coordinate representation of the second point; determining a first scalar multiplication of the first point with a first scalar, the first scalar multiplication comprising performing iteratively in relation to the value of the first scalar either one of: doubling of a current value of the first point in Jacobian projective coordinates; or mixed addition of a current value of the first point with the initial value of the first point in affine coordinates; determining a second scalar multiplication of the second point with a second scalar, the second scalar multiplication comprising performing iteratively in relation to the value of the second scalar either one of: doubling of a current value of the second point in Jacobian projective coordinates; or mixed addition of a current value of the second point with the initial value of the second point in affine coordinates; determining a combination point by adding the resultant of the first scalar multiplication to the resultant of the second scalar multiplication in Jacobian projective coordinates; and transforming the combination point to affine coordinates.

In a particular case, the first point or the second point, or both, is a generator point of the elliptic curve.

In another case, mixed addition with the first point comprises performing addition on the current value of the first point at a particular iteration, in Jacobian projective coordinates, with the initial value of the first point, in affine coordinates, to produce a resultant value for the first point in Jacobian projective coordinates, and mixed addition with the second point comprises performing addition on the current value of the second point at a particular iteration, in Jacobian projective coordinates, with the original value of the second point, in affine coordinates, to produce a resultant value for the second point in Jacobian projective coordinates.

In yet another aspect, there is provided a method for determining a linear combination operation for an elliptic curve cryptographic scheme, the elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the linear operation comprising a first scalar ("s"), a second scalar ("r"), a first point ("P") in affine coordinates, and a second point ("Q") in affine coordinates, the linear operation having a representation in the form $s \cdot P + r \cdot Q$, the method comprising: obtaining a Jacobian projective coordinate representation of the first point; obtaining a Jacobian projective coordinate representation of the second point; determining a first resultant point via scalar multiplication of the first point by the first scalar using a double-and-add technique, the first resultant point being in Jacobian projective coordinates; determining a second resultant point via scalar multiplication of the second point by the second scalar using a double-and-add technique, the second resultant point being in Jacobian projective coordinates; determining a combination point by adding the first resultant point to the second resultant point; and transforming the combination point into affine coordinates.

In a particular case, determining the first resultant point via scalar multiplication using the double-and-add technique comprises mixed addition with the first point using the affine coordinates of the first point, and determining the second resultant point via scalar multiplication using the double-and-add technique comprises mixed addition with the second point using the affine coordinates of the second point.

In another case, mixed addition on the first point comprises performing addition on a current value of the first point at a particular iteration, in Jacobian projective coordinates, with the initial value of the first point, in affine coordinates, to obtain a resultant value for the first point in Jacobian projective coordinates, and mixed addition with the second point comprises performing addition on a current value of the second point at a particular iteration, in Jacobian projective coordinates, with the initial value of the second point, in affine coordinates, to obtain a resultant value for the second point in Jacobian projective coordinates.

In yet another case, the first point or the second point, or both, is a generator point of the elliptic curve.

In yet another aspect, there is provided, a system for implementing an elliptic curve cryptographic scheme on a correspondent device, the elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the cryptographic scheme comprising a linear operation, the linear operation comprising a first scalar ("r"), a second scalar ("s"), a first point ("Q") in affine coordinates, and a second point ("P") in affine coordinates, the linear operation having a representation in the form $s \cdot (P + r \cdot Q)$, the system comprising: a first representation obtainment module for obtaining a Jacobian projective coordinate representation of the first point; a first determination module for determining a first resultant point via scalar multiplication of the first point by the first scalar using a double-and-add technique, the first resultant point being in Jacobian projective coordinates; an addition module for determining a combination point by adding the first resultant point to the second point; a second representation obtainment module for obtaining a Jacobian projective coordinate representation of the combination point; a second determination module for determining a second resultant point via scalar multiplication of the combination point by the second scalar using a double-and-add technique, the second resultant point being in Jacobian projective coordinates; and a transformation module for transforming the second resultant point into affine coordinates.

In a particular case, determining the first resultant point via scalar multiplication using the double-and-add technique comprises mixed addition by the first determination module with the first point using the affine coordinates of the first point, and determining the second resultant point via scalar multiplication using the double-and-add technique comprises mixed addition by the second determination module on the combination point using the affine coordinates of the combination point.

In another case, mixed addition with the first point comprises performing by the first determination module addition on a current value of the first point at a particular iteration, in Jacobian projective coordinates, with the initial value of the first point, in affine coordinates, to obtain a resultant value for the first point in Jacobian projective coordinates, and mixed addition with the combination point comprises performing by the second determination module addition on a current value of the combination point at a particular iteration, in Jacobian projective coordinates, with the initial value of the combination point, in affine coordinates, to obtain a current value for the combination point in Jacobian projective coordinates.

In yet another case, determining the combination point comprises mixed addition with the addition module of the first resultant point in Jacobian projective coordinates and the second point in affine coordinates.

In yet another case, the first point or the second point, or both, is a generator point of the elliptic curve.

In yet another aspect, there is provided a system for implementing an elliptic curve cryptographic scheme on a correspondent device, the elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the cryptographic scheme comprising a linear operation, the linear operation comprising a first scalar ("s"), a second scalar ("r"), a first point ("P") in affine coordinates, and a second point ("Q") in affine coordinates, the linear operation having a representation in the form s·P+r·Q, the system comprising: a first representation obtainment module for obtaining a Jacobian projective coordinate representation of the first point; a second representation obtainment module for obtaining a Jacobian projective coordinate representation of the second point; a first determination module for determining a first resultant point via scalar multiplication of the first point by the first scalar using a double-and-add technique, the first resultant point being in Jacobian projective coordinates; a second determination module for determining a second resultant point via scalar multiplication of the second point by the second scalar using a double-and-add technique, the second resultant point being in Jacobian projective coordinates; an addition module for determining a combination point by adding the first resultant point to the second resultant point; and a transformation module for transforming the combination point into affine coordinates.

In a particular case, determining the first resultant point via scalar multiplication using the double-and-add technique comprises mixed addition by the first determination module with the first point using the affine coordinates of the first point, and determining the second resultant point via scalar multiplication using the double-and-add technique comprises mixed addition by the second determination module with the second point using the affine coordinates of the second point.

In another case, mixed addition with the first point comprises performing addition by the first determination module on a current value of the first point at a particular iteration, in Jacobian projective coordinates, with the initial value of the first point, in affine coordinates, to obtain a resultant value for the first point in Jacobian projective coordinates, and mixed addition with the second point comprises performing by the second determination module addition on a current value of the second point at a particular iteration, in Jacobian projective coordinates, with the initial value of the second point, in affine coordinates, to obtain a resultant value for the second point in Jacobian projective coordinates.

In yet another case, the first point or the second point, or both, is a generator point of the elliptic curve.

These and other embodiments are contemplated and described herein. It will be appreciated that the foregoing summary sets out representative aspects of embodiments for a protocol, method and system to assist skilled readers in understanding the following detailed description.

DESCRIPTION OF THE DRAWINGS

An embodiment of the present invention will now be described by way of example only with reference to the accompanying drawings, in which.

DETAILED DESCRIPTION

Figure 1:
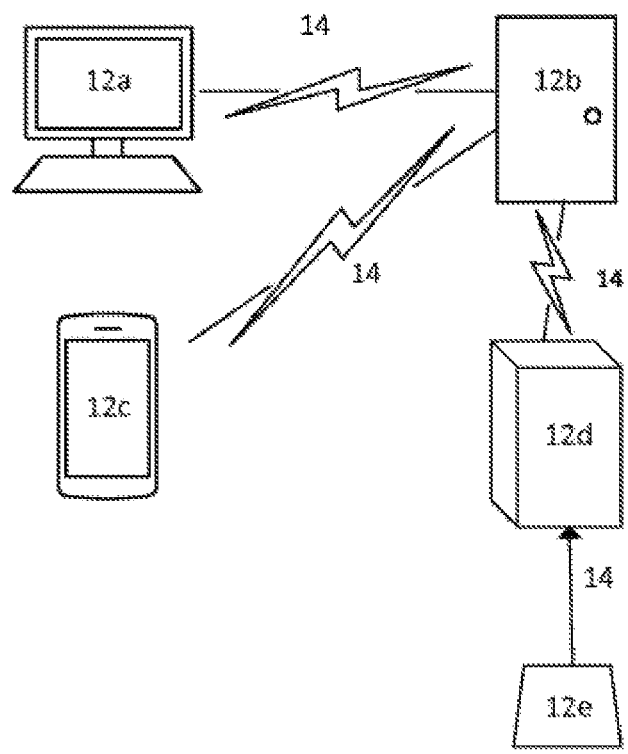
FIG. 1 is a schematic representation of a data communication system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, computing device, mechanism, terminal or other device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media and executed by the one or more processors.

The following relates to data communication systems and cryptographic schemes utilized in such systems; and more specifically, to determining linear combinations in elliptic curve cryptography.

Turning to FIG. 1, an embodiment of a data communication system 10 is shown. The data communication system 10 includes a plurality of devices 12 interconnected by communication links 14. The devices 12 may be of any known type including a computer 12a, a server 12b, a cellphone 12c, ATM 12d, and smart card 12e. The communication links 14 may be conventional fixed telephone lines, wireless connections implemented between the devices 12, near field communication connections such as Bluetooth™ or other conventional forms of communication.

Figure 2:
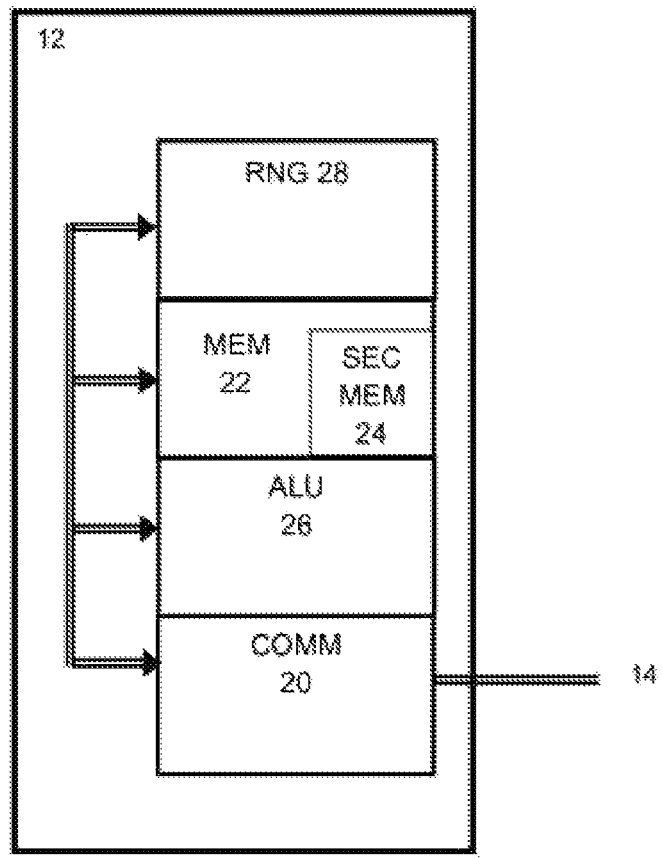
FIG. 2 is a representation of a device used in the data communication system of FIG. 1.

As shown in FIG. 2, the devices 12 will differ according to their intended purpose, but typically will include a communication module 20 for communication to the links 14. A memory 22 provides a storage medium for non-transient instructions to implement protocols and to store data as required. The instructions are executed by an arithmetic logic unit (ALU) 26 (or processing unit). A secure memory module 24, which may be part of memory 22 or may be a separate module, is used to store private information, such as the private keys used in the encryption protocols and withstand tampering with that data. The arithmetic logic unit (ALU) 26 (or processing unit) is provided to perform the arithmetic operations instruction by the memory 22 using data stored in the memories 22, 24. A random or pseudo random number generator 28 is also incorporated to generate bit strings representing random numbers in a cryptographically secure manner.

It will be appreciated that the device 12 illustrated in FIG. 2, is highly schematic and representative of a conventional device used in a data communication system.

The memory 22 stores system parameters for the ECC scheme to be implemented and a set of computer readable instructions to implement the ECC scheme. The parameters can be represented as bit strings, or any other suitable computer-readable representation.

Finite field arithmetic in $F_p$ includes operations that vary greatly in efficiency. Notably, modular inversion can be slower than the other operations by about two orders of magnitude. Conventional approaches tend to rely heavily on inversion operations if standard affine coordinates are used. In some cases, problems related to inversion operations can be alleviated by using transformations to other coordinate systems that reduce the quantity of inversions, but increase the number of modular multiplications. As described herein, Applicant has advantageously determined a system and method that selects, for each ECC operation or step, one or more coordinate transformations that lead to coordinates with an optimal inversion-to-multiplication (I/M) ratio. In an example, candidates for coordinates are the following:

Affine coordinates;
Standard projective coordinates;
Jacobian projective coordinates;
Chudnovsky projective coordinates; and
Modified Jacobian projective coordinates.

In further cases, such as for the point addition operation in ECC, it is also possible to perform the operation in mixed coordinates. Hence, for further optimization, mixed coordinates will be considered.

In a representative example, let $E: y^2 = x^3 + ax + b$ be the equation of the elliptic curve. Coordinates of this curve can be represented in the following ways:

Affine coordinates: From a curve in Weierstrass form $y^2 = x^3 + Ax + B$, a point $P_1$ is represented with the $x_1$ and $y_1$ coordinates: $P_1 = (x_1, y_1)$;
Standard projective coordinates: A projective point $(X:Y:Z)$, $Z \neq 0$, corresponds to the affine point $(X/Z, Y/Z)$;
Jacobian projective coordinates: A Jacobian point $(X:Y:Z)$, $Z \neq 0$, corresponds to the affine point $(X/Z^2, Y/Z^3)$;
Chudnovsky projective coordinates: A Chudnovsky point $(X:Y:Z:Z^2:Z^3)$ corresponds to the Jacobian point $(X:Y:Z)$, $Z \neq 0$; and
Modified Jacobian projective coordinates: A Jacobian point $(X:Y:Z:aZ^4)$, $Z \neq 0$, corresponds to the affine point $(X/Z^2, Y/Z^3)$.

Figure 7:
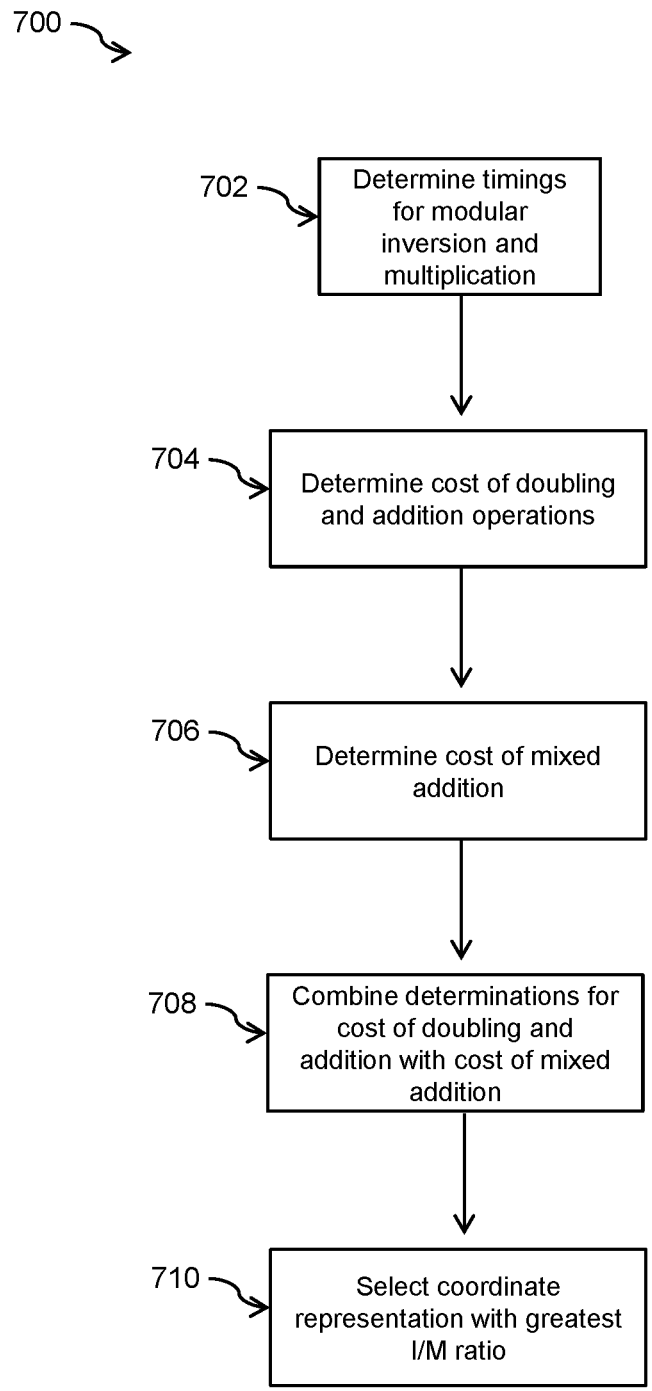
FIG. 7 is a flowchart showing a method for selecting coordinate transformations, according to an embodiment.

As shown in the flowchart of FIG. 7, there is provided a method for selecting coordinate transformations 700. At block 702, timings are determined for modular inversion and modular multiplication in $F_p$ for a target system. At block 704, for each coordinate representation, the cost of doubling and addition operations for elliptic curves is determined in terms of finite field operations. At block 706, the cost of addition operations for elliptic curves is determined in terms of finite field operations for mixed coordinate addition. At block 708, the determinations from block 704 and block 706 are combined. At block 710, the coordinate representation with the most greatest I/M ratio is selected.

In implementations of ECC schemes, a common operation to perform scalar multiplication consists of a series of doublings and additions. The operations on elliptic curve points are doubling ($P \rightarrow 2 \cdot P$) and addition ($P, Q \rightarrow P + Q$). Thus, a most optimal coordinate representation should consider both of these two operations to evaluate and compare the results.

Field inversion is an expensive operation. For example, for one of the National Institute of Standards and Technology (NIST) defined finite fields, implementation results show that the inversion cost is approximately equivalent to the cost of 80 multiplications. In some cases, this cost can be much larger; for example, in the range of 260 to 550, correlating to the bitsize of the field. Thus, in some cases, switching to other coordinate representations can save substantial computational cost.

Applicants have performed an analysis to figure out which approach is generally the most efficient. In such analysis, "I" represents a field inversion operation, "M" represents a field multiplication operation, and "S" represents a field squaring operation. An example for one of the analysis is described below.

For example, for doubling using Jacobian projective coordinates: Let $P_1=(X_1,Y_1,Z_1)$, $P_2=(X_2,Y_2,Z_2)$ and $P_3=(X_3,Y_3,Z_3)=P_1+P_2$. The procedure to compute $P_3$ is as follows:

$$U_1 = X_1 \cdot Z_2^2 \quad \text{Step 1.}$$

$$U_2 = X_2 \cdot Z_1^2 \quad \text{Step 2.}$$

$$S_1 = Y_1 \cdot Z_2^3 \quad \text{Step 3.}$$

$$S_2 = Y_2 \cdot Z_1^3 \quad \text{Step 4.}$$

If $U_1 = U_2$ and $S_1 \neq S_2$, return the identity *point*  Step 5.

$$H = U_2 - U_1 \quad \text{Step 6.}$$

$$R = S_2 - S_1 \quad \text{Step 7.}$$

$$X_3 = R^2 - H^3 - 2U_1 \cdot H^2 \quad \text{Step 8.}$$

$$Y_3 = R \cdot (U_1 \cdot H^2 - X_3) - S_1 \cdot H^3 \quad \text{Step 9.}$$

$$Z_3 = H \cdot Z_1 \cdot Z_2 \quad \text{Step 10.}$$

Return $P_3 = (X_3, Y_3, Z_3)$ Step 11.

Next, the number of field operations is determined. Step 1 and 2, each take S+M. For step 3, there is already $Z_2^2$, hence only 2M is needed to compute it. Similarly, step 4 takes 2M. The next three steps are free. Step 8 needs S for $R^2$, S+M for $U_1 \cdot H^2$ and there is already $H^2$, only M for $H^3$ is needed, giving a total of 2S+2M. For step 9, since there is already $U_1 \cdot H^2$ and $H^3$, only 2M is needed. Finally, step 10 takes 2M. The total is 12M+4S.

This procedural analysis was completed by Applicant for the other various coordinate representations with respect to the cost of elliptic curve addition and doubling. Applicant's analysis can be summarized as follows:

- Affine coordinates: Doubling=1I+2M+2S; Addition=1I+2M+1S.
- Standard projective coordinates: Doubling=7M+5S; Addition=12M+2S.
- Jacobian projective coordinates: Doubling=4M+6S; Addition=12M+4S.
- Chudnovsky projective coordinates: Doubling=5M+6S; Addition=11M+3S.
- Modified Jacobian projective coordinates: Doubling=4M+4S; Addition=13M+6S.

Applicant then analyzed the mixed coordinate addition. Let A stand for Affine, P for Standard projective, J for Jacobian projective, C for Chudnovsky projective, and L for Modified Jacobian. Applicant's analysis can be summarized as follows:

| Coordinates | Resulting Coordinates | Cost |
|---|---|---|
| P + A | P | 9M + 2S |
| J + A | J | 8M + 3S |
| J + C | J | 11M + 3S |
| C + A | C | 8M + 3S |
| L + A | L | 9M + 5S |
| L + C | L | 12M + 5S |

Taking the fact that the number of point doublings and additions is approximately the same, optimization on the value of cost of doubling+addition is needed. The following gives the cost for various point representations:

| | Doubling | Addition | Total Cost |
|---|---|---|---|
| Affine coordinates | 1I + 2M + 2S | 1I + 2M + 1S | 2I + 4M + 3S |
| Standard projective coordinates | 7M + 5S | 12M + 2S | 19M + 7S |
| Jacobian projective coordinates | 4M + 6S | 12M + 4S | 16M + 10S |
| Chudnovsky projective coordinates | 5M + 6S | 11M + 3S | 16M + 9S |
| Modified Jacobian projective coordinates | 4M + 4S | 13M + 6S | 17M + 10S |

Next, combining the doubling and point addition in mixed coordinates is determined. Since one of the main computations will be scalar multiplications, it is important that whenever mixed addition is used, the result is in the coordinates in which the doubling is performed. Otherwise, extra conversions would be required between the points, which would make the approach inefficient. The costs can be summarized as follows:

| Coordinates | Resulting Coordinates | Cost of addition | Cost of doubling | Total Cost |
|---|---|---|---|---|
| P + A | P | 9M + 2S | 7M + 5S | 16M + 7S |
| J + A | J | 8M + 3S | 4M + 6S | 12M + 9S |
| J + C | J | 11M + 3S | 4M + 6S | 15M + 9S |
| C + A | C | 8M + 3S | 5M + 6S | 13M + 9S |
| L + A | L | 9M + 5S | 4M + 4S | 13M + 9S |
| L + C | L | 12M + 5S | 4M + 4S | 16M + 9S |

Observing the results, it can be seen that in comparison to J+C, C+A, L+A, L+C, the method J+A is most efficient. Thus only P+A is left to compare. P+A requires four more multiplications, but two less squarings. Squaring is a special case of multiplication, hence has a complexity of no more than multiplication. Thus, Applicant determined that J+A, with doubling in Jacobian projective coordinates, to be most efficient.

The fact is that there is a cost of converting between the coordinate representations. Converting from affine to any of the representations is computationally free; however, converting to affine will typically require a field inversion for each coordinate (i.e. x and/or y). It may also require one field squaring; however, the cost of this is typically negligible in comparison to inversion. Point doubling or addition in affine coordinates involves one inversion. Hence, the computation can be accomplished by (i) affine to other coordinate representation, (ii) computation in other coordinate representation, and (iii) other coordinate representation to affine. To increase efficiency, the conversion to the other representation is required when the operation involves more than one addition and/or doubling operation for the case when only one coordinate is needed. Additionally, the conversion to the other representation is required when more than two addition and/or doubling operations for the case when both coordinates of the point are needed. In practice, the latter will be most common due to the fact that the most common operation is scalar multiplication, which involves, approximately, the bitsize of the prime p quantity of addition/doubling operations.

Through analysis, Applicant has determined that generally the most optimal coordinate representation to use in ECC is Jacobian, with the point addition performed using mixed coordinates. In most cases in ECC, the affine coordinates of the original point will be available, and thus, mixed point addition will be applicable. The efficiency increases are especially prevalent for the scalar multiplication operation when using a double-and-add approach. For the addition portion of the approach, the original point is added to the current state of the point. The current state of the point will naturally be in Jacobian, and the original point in affine, thus obtaining a result in Jacobian. These facts make the double-and-add type algorithm run naturally, giving outputs in Jacobian.

With the Applicant's determination of using Jacobian with mixed coordinates, the computations cost savings can be substantial. For a non-optimized version, scalar multiplication takes about $3t/2+2$ doublings/additions; where t is the bitsize of the prime. In affine coordinates, each step involves one inversion, but takes about seven fewer multiplications than a Jacobian approach. At the end, two inversions are performed using the Jacobian. Hence, this approach saves approximately $3t/2 \cdot (I-7M)$. Due to the fact that $I \gg 7M$, the savings can be substantial. As will described in greater detail herein, this approach also advantageously has M=S.

As described herein, Applicant has determined that Jacobian projective coordinates are generally more efficient to use than affine coordinates. However, generally, the original input is in affine coordinates and the final output is also in affine coordinates. Accordingly, there are typically conversion costs involved. Converting from affine to any of the coordinate representations, including Jacobian, is typically computationally free; however, converting from one of the coordinate representations to affine coordinates will typically require a field inversion for each coordinate, totalling two field inversions.

In general, the approach of the present embodiments is to (i) convert affine coordinates to projective coordinates, (ii) compute the operation in projective coordinates, and (iii) convert the result from projective coordinates to affine coordinates. In a particular embodiment, this approach can be used to determine scalar multiplication in ECC schemes. In further embodiments, as described herein, this approach may be used for other types of operations on elliptic curves, which arise in a number of ECC schemes, and are usually referred to as linear combinations. Two such linear combination operations are:

$s \cdot P + r \cdot Q$, and $s \cdot (P + r \cdot Q)$.

In further cases, the embodiments described herein may include a combination of the above two linear operations, or simplified versions of the above two linear operations.

For these types of operations, Applicant determined that using Jacobian projective coordinates, as described herein, is substantially more efficient than using affine coordinates. Applicant further determined improvements that can be made for linear combination type operations. In certain cases, advantageously, further optimization can be achieved by not converting to affine coordinates in between computation in Jacobian projective coordinates. In this case, if an operation is in Jacobian projective coordinates, determining whether the next operation is also in Jacobian projective coordinates, and then keeping the coordinate representation in Jacobian projective coordinates.

Figure 3:
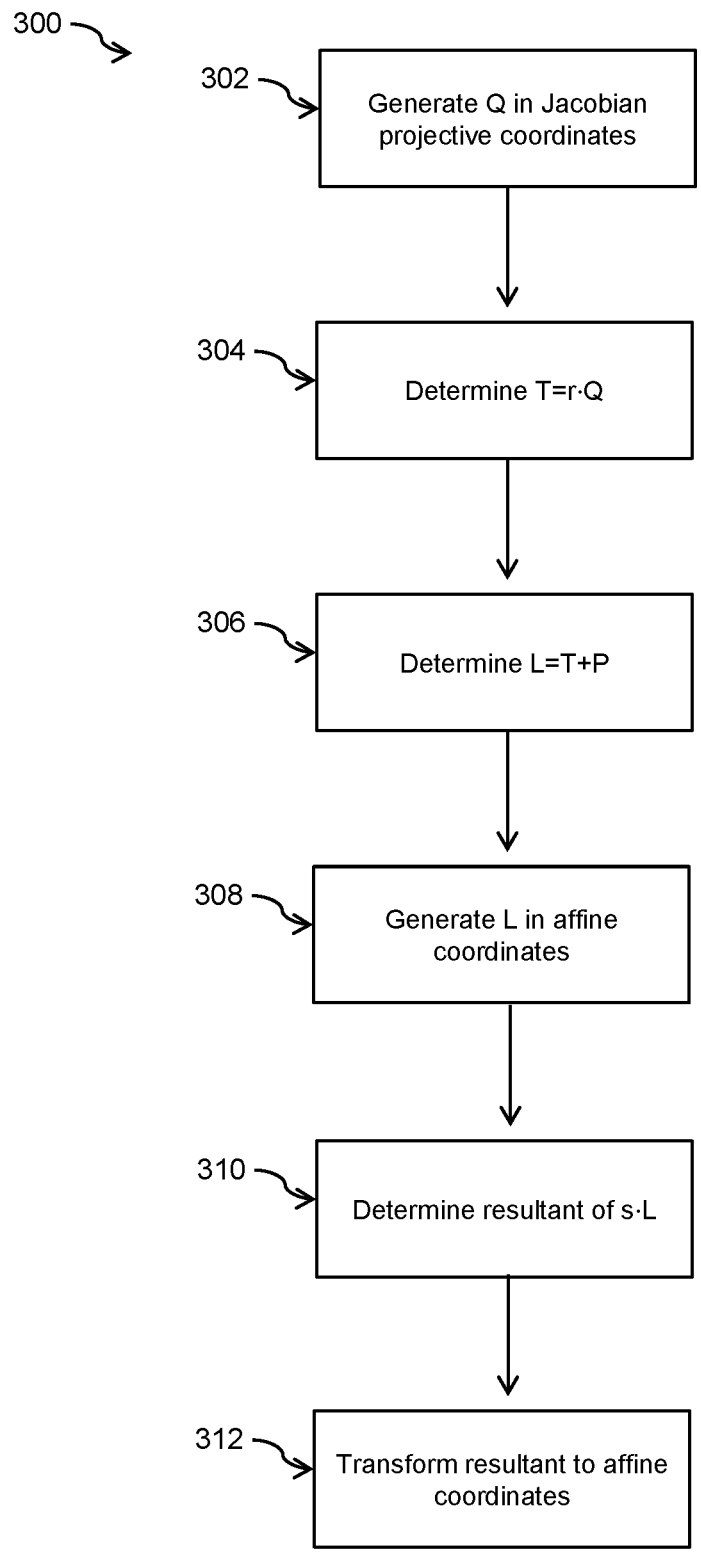
FIG. 3 is a flow chart showing a method for determining a linear combination operation for an elliptic curve cryptographic scheme, according to an embodiment.

In an embodiment, as shown in FIG. 3, there is provided a method 300 for determining a linear combination operation for an elliptic curve cryptographic scheme. Whereby the elliptic curve cryptographic scheme permits secure communications between two or more cryptographic correspondent devices 12. The method 300 determines the linear operation $s \cdot (P + r \cdot Q)$, given scalars s and r, and points P and Q in affine coordinates.

At block 302, a representation of Q in Jacobian projective coordinates is obtained. The representation of Q in affine coordinates is also preserved.

At block 304, $T = r \cdot Q$ is determined in Jacobian projective coordinates using a double-and-add technique, whereby "T" is a first resultant point. Where, during the ADD operations, the affine coordinates of Q are used in mixed addition.

At block 306, point P is added to point T, such that $L = T + P$ is determined in Jacobian projective coordinates. For this operation, mixed coordinate addition is performed because P is in affine coordinates.

At block 308, a representation of L is obtained in affine coordinates. The Jacobian representation of L is also preserved.

At block 310, a second resultant point is determined by $s \cdot L$ using the double-and-add technique. Where, during the ADD operations, the affine coordinates of L are used in mixed addition.

At block 312, the second resultant point is transformed from Jacobian projective coordinates to affine coordinates.

Comparing method 300 to conventional approaches, method 300, using Jacobian projective coordinates, advantageously saves two field inversions after block 304. The savings of two field inversions, which can be the most expensive field operations, can give an improvement in performance by approximately 10 percent.

Figure 4:
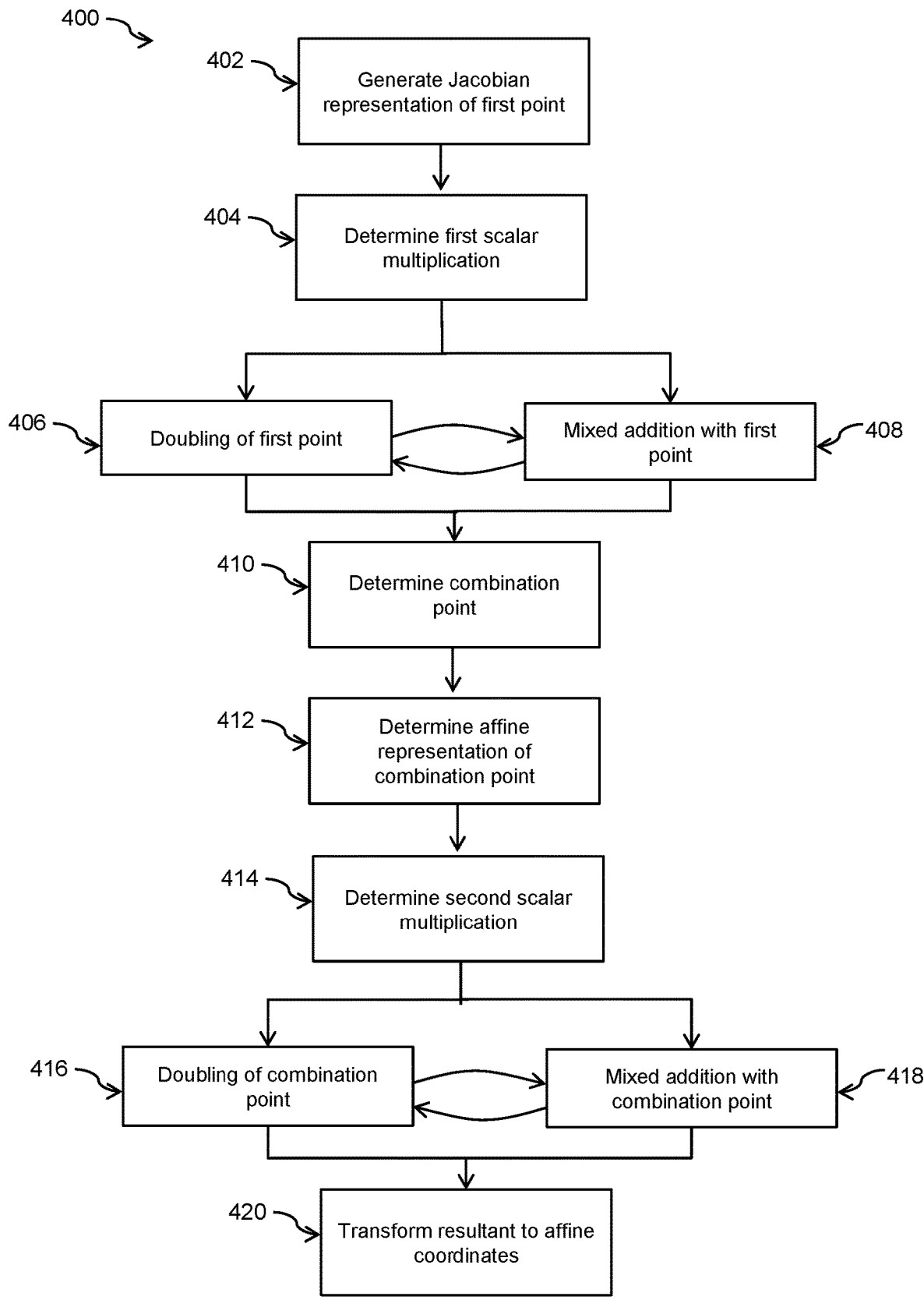
FIG. 4 is a conceptual flowchart showing a protocol for determining linear combinations of a first point and a second point for an elliptic curve cryptography scheme, according to an embodiment.

In an embodiment, as shown in the conceptual flowchart of FIG. 4, there is provided a protocol 400 for determining linear combinations of a first point and a second point for an elliptic curve cryptography scheme. The first point and the second point being in affine coordinates. Whereby the elliptic curve cryptographic scheme permits secure communications between two or more cryptographic correspondent devices 12.

The protocol 400, at block 402, includes obtaining a Jacobian projective coordinate representation of the first point.

The protocol 400 further includes, at block 404, determining a first scalar multiplication of the first point with a first scalar. The first scalar multiplication 404 includes performing iteratively in relation to the value of the first scalar either one of (1) at block 406, doubling of the first point in Jacobian projective coordinates; or (2) at block 408, mixed addition using the first point in affine coordinates.

The protocol 400 further includes, at block 410, determining a combination point by adding the second point to the resultant of the first scalar multiplication. Then, at block 412, obtaining an affine coordinate representation of the combination point.

The protocol 400 further includes, at block 414, determining a second scalar multiplication of the combination point with a second scalar. The second scalar multiplication 414 includes performing iteratively in relation to the value of the second scalar either one of (1) at block 416, doubling of the combination point in Jacobian projective coordinates; or (2) at block 418, mixed addition using the combination point in affine coordinates.

The protocol 400 further includes, at block 420, transforming the resultant of the second scalar multiplication to affine coordinate.

Figure 5:
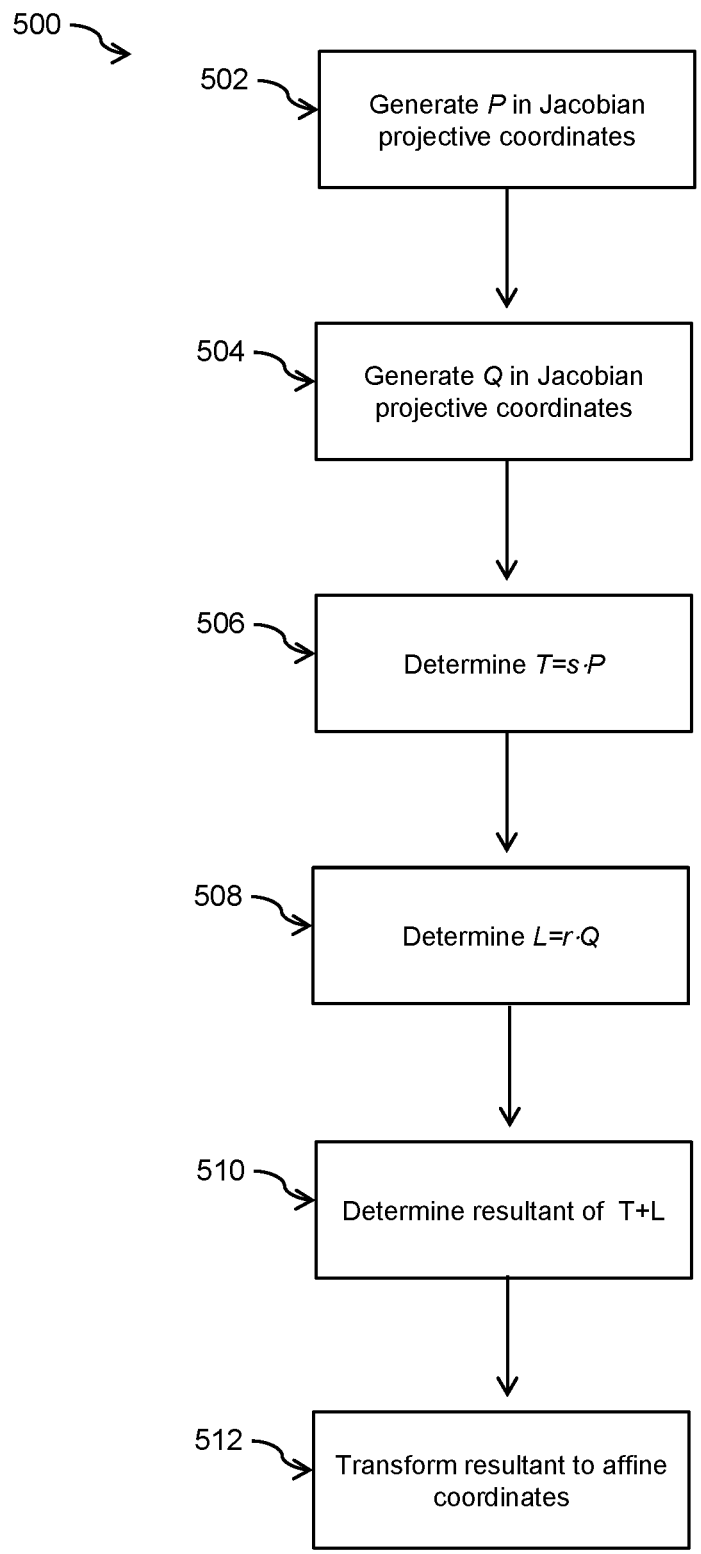
FIG. 5 is a flow chart showing a method for determining a linear combination operation for an elliptic curve cryptographic scheme, according to another embodiment.

In another embodiment, as shown in FIG. 5, there is provided a method 500 for determining a linear combination operation for an elliptic curve cryptographic scheme. Whereby the elliptic curve cryptographic scheme permits secure communications between two or more cryptographic correspondent devices 12. The method 500 determines the linear operation s·P+r·Q, given scalars s and r, and points P and Q in affine coordinates.

At block 502, a representation of P is obtained in Jacobian projective coordinates from affine coordinates. The representation of P in affine coordinates is also preserved.

At block 504, a representation of Q is obtained in Jacobian projective coordinates from affine coordinates. The representation of Q in affine coordinates is also preserved.

At block 506, a first resultant point T is determined by T=s·P in Jacobian projective coordinates using a double-and-add technique. Where, during the ADD operations, the affine coordinates of P are used in mixed addition.

At block 508, a first resultant point L is determined by L=r·Q in Jacobian projective coordinates using a double-and-add technique. Where, during the ADD operations, the affine coordinates of Q are used in mixed addition.

At block 510, a combination point is determined by T+L in Jacobian projective coordinates.

At block 512, the combination point is transformed from Jacobian projective coordinates to affine coordinates.

Comparing method 500 to conventional approaches, method 500, using Jacobian projective coordinates, saves two field inversions after block 506 and two more after block 508. At block 510, due to the fact that addition is performed in pure Jacobian projective coordinates, rather than mixed addition, there is a loss of efficiency; however this loss is only 4M+S, which is negligible compared even to a single inversion. Hence, method 500 advantageously includes a total savings of four inversions compared to conventional approaches. Thus, method 500 can result in an improvement of performance of approximately 15 percent.

Figure 6:
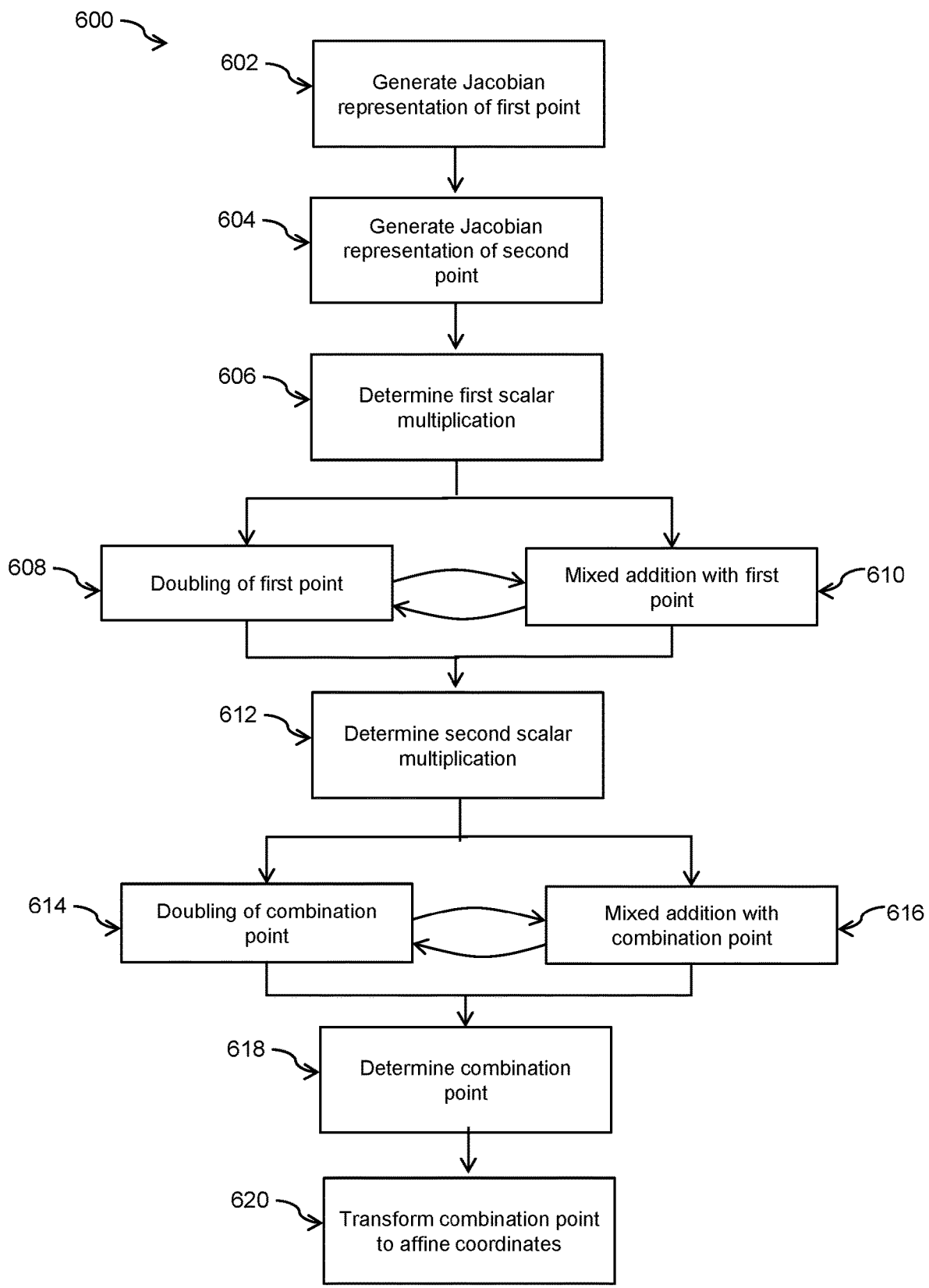
FIG. 6 is a conceptual flowchart showing a protocol for determining linear combinations of a first point and a second point for an elliptic curve cryptography scheme, according to another embodiment.

In another embodiment, as shown in the conceptual flowchart of FIG. 6, there is provided a protocol 600 for determining linear combinations of a first point and a second point for an elliptic curve cryptography scheme. The first point and the second point being in affine coordinates. Whereby the elliptic curve cryptographic scheme permits secure communications between two or more cryptographic correspondent devices 12.

The protocol 600, at block 602, includes obtaining a Jacobian projective coordinate representation of the first point, and, at block 604, obtaining a Jacobian projective coordinate representation of the second point.

The protocol 600 further includes, at block 606, determining a first scalar multiplication of the first point with a first scalar. The first scalar multiplication 606 includes performing iteratively in relation to the value of the first scalar either one of (1) at block 608, doubling of the first point in Jacobian projective coordinates 608; or (2) at block 610, mixed addition with the first point in affine coordinates.

The protocol 600 further includes, at block 612, determining a second scalar multiplication of the combination point with a second scalar. The second scalar multiplication 612 includes performing iteratively in relation to the value of the second scalar either one of (1) at block 614, doubling of the combination point in Jacobian projective coordinates 614; or (2) at block 616, mixed addition with the combination point in affine coordinates.

The protocol 600 further includes, at block 618, determining a combination point by adding the resultant of the first scalar multiplication 606 to the resultant of the second scalar multiplication 612 in Jacobian projective coordinates. Then, at block 620, transforming the combination point to affine coordinates.

Figure 8:
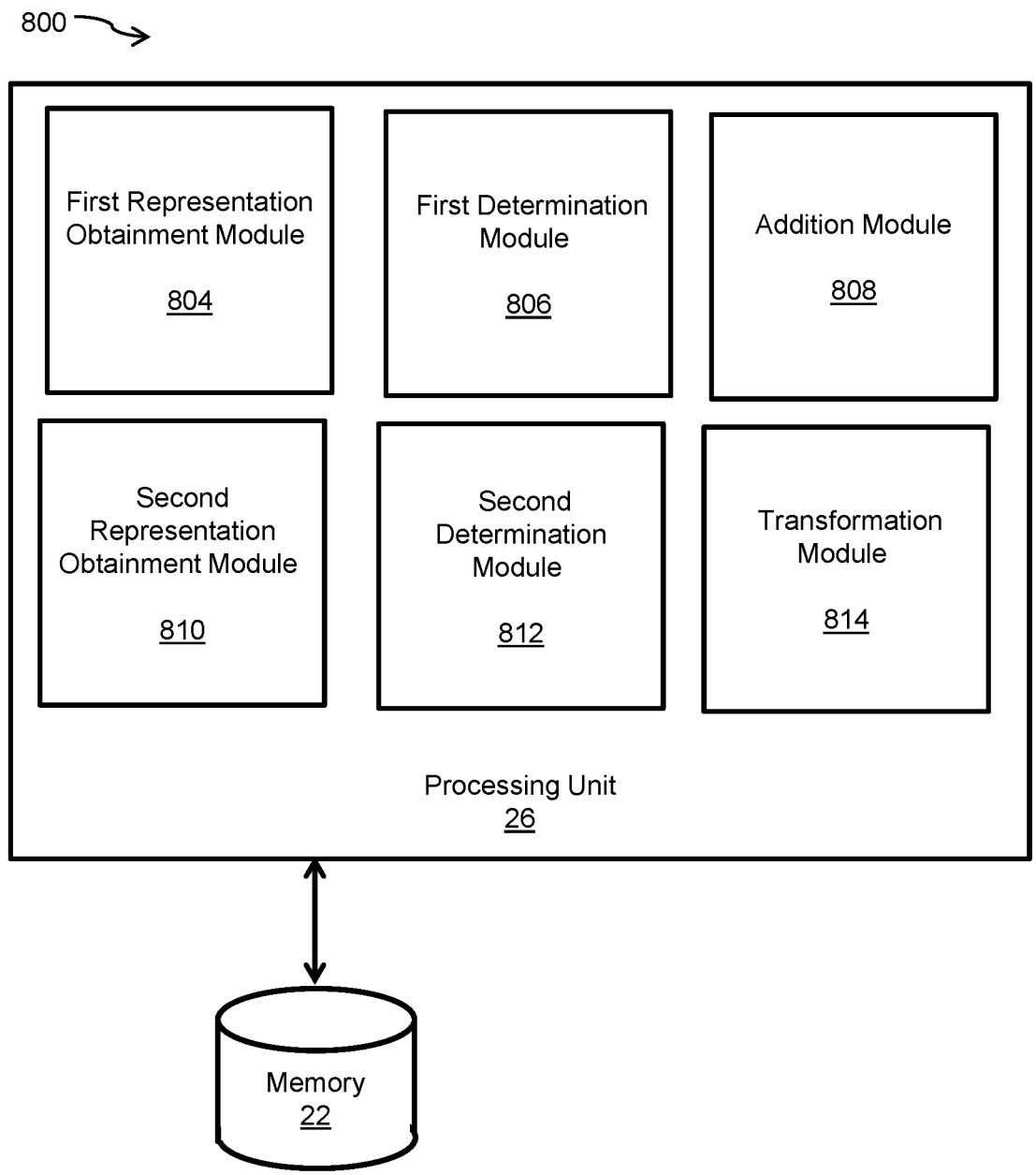
FIG. 8 is a block diagram of a system for implementing an elliptic curve cryptographic scheme on a correspondent device, according to an embodiment.

Turning to FIG. 8, there is provided a block diagram for a system 800 for implementing an elliptic curve cryptographic ("ECC") scheme on a correspondent device, according to an embodiment. The system 800 implemented on a correspondent device 12 includes the processing unit 26 and memory 22. The processing unit 26 includes a first representation obtainment module 804, a first determination module 806, an addition module 808, a second representation obtainment module 810, a second determination module 812, and a transformation module 814.

The cryptographic scheme includes a linear operation. The linear operation includes a first scalar ("r"), a second scalar ("s"), a first point ("Q") in affine coordinates, and a second point ("P") in affine coordinates. The linear operation having a representation in the form s·(P+r·Q).

The first representation obtainment module 804 obtains a Jacobian projective coordinate representation of the first point. The first determination module 806 determines a first resultant point via scalar multiplication of the first point by the first scalar using a double-and-add technique, the first resultant point being in Jacobian projective coordinates. The addition module 808 determines a combination point by adding the first resultant point to the second point. The second representation obtainment module 810 obtains a Jacobian projective coordinate representation of the combination point. The second determination module 812 determines a second resultant point via scalar multiplication of the combination point by the second scalar using a double-and-add technique, the second resultant point being in Jacobian projective coordinates. The transformation module 814 transforms the second resultant point into affine coordinates.

In some cases, determining the first resultant point via scalar multiplication using the double-and-add technique includes mixed addition by the first determination module 806 with the first point using the affine coordinates of the first point, and determining the second resultant point via scalar multiplication using the double-and-add technique includes mixed addition by the second determination module 812 with the combination point using the affine coordinates of the combination point.

In further cases, mixed addition with the first point includes performing by the first determination module 806 addition on the value of the first point at a particular iteration, in Jacobian projective coordinates, with the original value of the first point, in affine coordinates, to produce a value for the first point in Jacobian projective coordinates, and mixed addition with the combination point includes performing by the second determination module 812 addition on the value of the combination point at a particular iteration, in Jacobian projective coordinates, with the original value of the combination point, in affine coordinates, to produce a value for the combination point in Jacobian projective coordinates.

In some cases, the combination point includes mixed addition by the addition module of the first resultant point in Jacobian projective coordinates with the second point in affine coordinates.

In some cases, the first point or the second point, or both, is a generator point of the elliptic curve.

Figure 9:
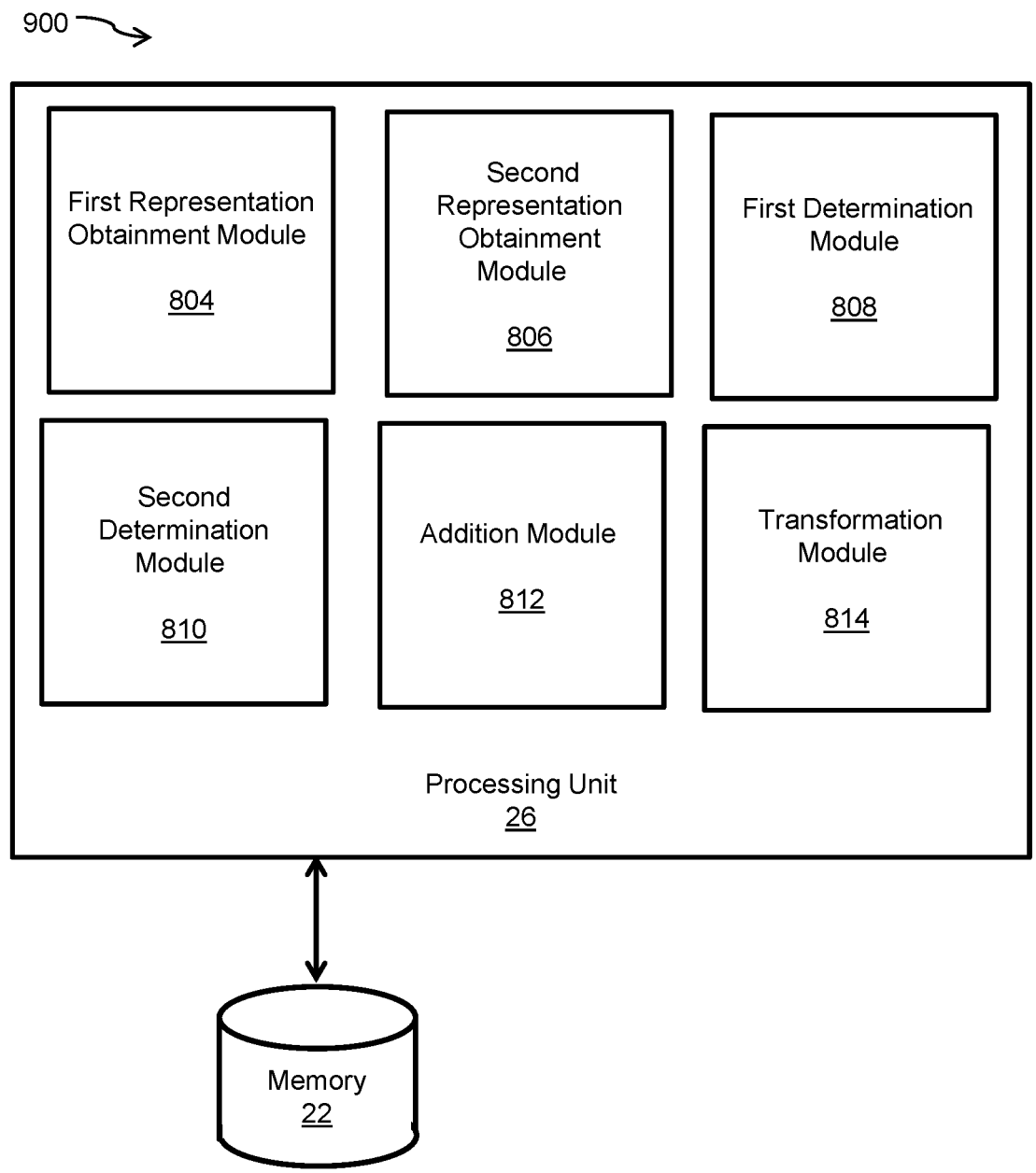
FIG. 9 is a block diagram of a system for implementing an elliptic curve cryptographic scheme on a correspondent device, according to another embodiment.

Turning to FIG. 9, there is provided a block diagram for a system 900 for implementing an elliptic curve cryptographic ("ECC") scheme on a correspondent device, according to another embodiment. The system 900 implemented on a correspondent device 12 includes the processing unit 26 and memory 22. The processing unit 26 includes a first representation obtainment module 804, a second representation obtainment module 806, a first determination module 808, a second determination module 810, an addition module 812, and a transformation module 814.

The cryptographic scheme includes a linear operation. The linear operation includes a first scalar ("r"), a second scalar ("s"), a first point ("Q") in affine coordinates, and a second point ("P") in affine coordinates. The linear operation having a representation in the form s·P+r·Q.

The first representation obtainment module 804 obtains a Jacobian projective coordinate representation of the first point. The second representation obtainment module 806 obtains a Jacobian projective coordinate representation of the second point.

The first determination module 808 determines a first resultant point via scalar multiplication of the first point by the first scalar using a double-and-add technique, the first resultant point being in Jacobian projective coordinates. The second determination module 810 determines a second resultant point via scalar multiplication of the second point by the second scalar using a double-and-add technique, the second resultant point being in Jacobian projective coordinates.

The addition module 812 determines a combination point by adding the first resultant point to the second resultant point in pure Jacobian coordinates. The transformation module 814 transforms the combination point into affine coordinates.

In some cases, determining the first resultant point via scalar multiplication using the double-and-add technique includes mixed addition by the first determination module 808 with the first point using the affine coordinates of the first point, and determining the second resultant point via scalar multiplication using the double-and-add technique includes mixed addition by the second determination module 810 with the second point using the affine coordinates of the second point.

In some cases, mixed addition with the first point includes performing addition by the first determination module 808 on the value of the first point at a particular iteration, in Jacobian projective coordinates, with the original value of the first point, in affine coordinates, to produce a value for the first point in Jacobian projective coordinates, and mixed addition with the second point includes performing by the second determination module 810 addition on the value of the second point at a particular iteration, in Jacobian projective coordinates, with the original value of the second point, in affine coordinates, to produce a value for the second point in Jacobian projective coordinates.

In some cases, the first point or the second point, or both, is a generator point of the elliptic curve.

In many cases, the linear combination operations referred to above can be found in ECC-based digital signature scheme verification procedures. Due to the fact that, in those circumstances, all the operations are typically public, countermeasures may not be needed. This can provide the freedom to apply as many optimizations techniques as possible, such as those described herein.

For the approaches described in method 300, protocol 400, method 500, protocol 600, system 800 and system 900 it is intended that, advantageously, provide a technological solution to technical problems relating to optimization of ECC. These approaches can provide computational savings arising out of savings from the number of field inversions required, which is generally the most expensive field operation. In further embodiments, the approaches described herein can be applied to ECC schemes with other types of projective coordinates.

Although the invention has been described with reference to certain specific embodiments, various other aspects, advantages and modifications thereof will be apparent to those skilled in the art without departing from the spirit and scope of the invention as outlined in the claims appended hereto. The entire disclosures of all references recited above are incorporated herein by reference.

We claim:

1. A protocol for determining linear combinations of a first point and a second point for an elliptic curve cryptography scheme, the elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the first point and the second point in affine coordinates, the protocol comprising:

obtaining a Jacobian projective coordinate representation of the first point;

determining a first scalar multiplication of the first point with a first scalar, the first scalar multiplication comprising performing multiple iterations using the value of the first scalar, for each iteration performing one of:

doubling of a current value of the first point in Jacobian projective coordinates; and mixed addition of a current value of the first point with the initial value of the first point in affine coordinates;

determining a combination point by adding the second point to the resultant of the first scalar multiplication;

obtaining an affine coordinate representation of the combination point;

determining a second scalar multiplication of the combination point with a second scalar, the second scalar multiplication comprising performing multiple iterations using the value of the second scalar, for each iteration performing one of:

doubling of a current value of the combination point in Jacobian projective coordinates; and mixed addition of a current value of the combination point with the initial value of the combination point in affine coordinates; and transforming the resultant of the second scalar multiplication to affine coordinates.

2. The protocol of claim 1, wherein the first point or the second point, or both, is a generator point of the elliptic curve.

3. The protocol of claim 1, wherein mixed addition with the first point comprises performing addition on the current value of the first point at a particular iteration, in Jacobian projective coordinates, with the initial value of the first point, in affine coordinates, to obtain a resultant value for the first point in Jacobian projective coordinates, and wherein mixed addition with the combination point comprises performing addition on the current value of the combination point at a particular iteration, in Jacobian projective coordinates, with the initial value of the combination point, in affine coordinates, to obtain a resultant value for the combination point in Jacobian projective coordinates.

4. A method for determining a linear combination operation for an elliptic curve cryptographic scheme, the elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the linear operation comprising a first scalar ("r"), a second scalar ("s"), a first point ("Q") in affine coordinates, and a second point ("P") in affine coordinates, the linear operation having a representation in the form s·(P+r·Q), the method comprising:

obtaining a Jacobian projective coordinate representation of the first point;

determining a first resultant point via a first scalar multiplication of the first point by the first scalar using a double-and-add technique, the first resultant point being in Jacobian projective coordinates, the first scalar multiplication comprising performing multiple iterations using the value of the first scalar, for each iteration performing one of:

doubling of a current value of the first point in Jacobian projective coordinates; and mixed addition of a current value of the first point with the initial value of the first point in affine coordinates;

determining a combination point by adding the first resultant point to the second point;

obtaining a Jacobian projective coordinate representation of the combination point;

determining a second resultant point via a second scalar multiplication of the combination point by the second scalar using a double-and-add technique, the second resultant point being in Jacobian projective coordinates, the second scalar multiplication comprising performing multiple iterations using the value of the second scalar, for each iteration performing one of:

doubling of a current value of the combination point in Jacobian projective coordinates; and mixed addition of a current value of the combination point with the initial value of the combination point in affine coordinates; and transforming the second resultant point into affine coordinates.

5. The method of claim 4, wherein determining the first resultant point via scalar multiplication using the double-and-add technique comprises mixed addition with the first point using the affine coordinates of the first point, and wherein determining the second resultant point via scalar multiplication using the double-and-add technique comprises mixed addition with the combination point using the affine coordinates of the combination point.

6. The method of claim 5, wherein mixed addition with the first point comprises performing addition on a current value of the first point at a particular iteration, in Jacobian projective coordinates, with the initial value of the first point, in affine coordinates, to produce a resultant value for the first point in Jacobian projective coordinates, and wherein mixed addition with the combination point comprises performing addition on a current value of the combination point at a particular iteration, in Jacobian projective coordinates, with the initial value of the combination point, in affine coordinates, to produce a resultant value for the combination point in Jacobian projective coordinates.

7. The method of claim 4, wherein determining the combination point comprises mixed addition of the first resultant point in Jacobian projective coordinates with the second point in affine coordinates.

8. The method of claim 4, wherein the first point or the second point, or both, is a generator point of the elliptic curve.

9. A system for implementing an elliptic curve cryptographic scheme on a correspondent device, the elliptic curve cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the cryptographic scheme comprising a linear operation, the linear operation comprising a first scalar ("r"), a second scalar ("s"), a first point ("Q") in affine coordinates, and a second point ("P") in affine coordinates, the linear operation having a representation in the form s·(P+r·Q), the system comprising:

a first representation obtainment module for obtaining a Jacobian projective coordinate representation of the first point;

a first determination module for determining a first resultant point via a first scalar multiplication of the first point by the first scalar using a double-and-add technique, the first resultant point being in Jacobian projective coordinates, the first scalar multiplication comprising performing multiple iterations using the value of the first scalar, for each iteration performing one of:

doubling of a current value of the first point in Jacobian projective coordinates; and mixed addition of a current value of the first point with the initial value of the first point in affine coordinates;

an addition module for determining a combination point by adding the first resultant point to the second point;

a second representation obtainment module for obtaining a Jacobian projective coordinate representation of the combination point;

a second determination module for determining a second resultant point via a second scalar multiplication of the combination point by the second scalar using a double-and-add technique, the second resultant point being in Jacobian projective coordinates, the second scalar multiplication comprising performing multiple iterations using the value of the second scalar, for each iteration performing one of:

doubling of a current value of the combination point in Jacobian protective coordinates; and mixed addition of a current value of the combination point with the initial value of the combination point in affine coordinates; and a transformation module for transforming the second resultant point into affine coordinates.

10. The system of claim 9, wherein determining the first resultant point via scalar multiplication using the double-and-add technique comprises mixed addition by the first determination module with the first point using the affine coordinates of the first point, and wherein determining the second resultant point via scalar multiplication using the double-and-add technique comprises mixed addition by the second determination module on the combination point using the affine coordinates of the combination point.

11. The system of claim 10, wherein mixed addition with the first point comprises performing by the first determination module addition on a current value of the first point at a particular iteration, in Jacobian projective coordinates, with the initial value of the first point, in affine coordinates, to obtain a resultant value for the first point in Jacobian projective coordinates, and wherein mixed addition with the combination point comprises performing by the second determination module addition on a current value of the combination point at a particular iteration, in Jacobian projective coordinates, with the initial value of the combination point, in affine coordinates, to obtain a current value for the combination point in Jacobian projective coordinates.

12. The system of claim 9, wherein determining the combination point comprises mixed addition with the addition module of the first resultant point in Jacobian projective coordinates and the second point in affine coordinates.

13. The system of claim 9, wherein the first point or the second point, or both, is a generator point of the elliptic curve.

* * * * *